United States Patent [19]

Schubert et al.

[11] 4,358,589

[45] Nov. 9, 1982

[54] NEMATIC LIQUID CRYSTAL COMPOUNDS

[75] Inventors: Herrmann Schubert, Nehlitz; Dietrich Demus, Halle; Horst Zaschke, Halle; Frank Kuschel, Halle; Gerhard Pelzl, Halle; Hans-Ulrich Nothnikz, Hoyerswerda; Willibald Schliemann, Halle, all of German Democratic Rep.

[73] Assignee: Veb Werk fur Fernsehelektronik im Veb Kombinat Mikroelektronik, Berlin-Oberschoneweide, German Democratic Rep.

[21] Appl. No.: 147,088

[22] Filed: May 7, 1980

Related U.S. Application Data

[63] Continuation of Ser. No. 9,046, Feb. 2, 1979, abandoned.

[51] Int. Cl.$^3$ .............. C09K 3/34; G02F 1/10; C07D 257/08
[52] U.S. Cl. .................. 544/179; 252/299.1; 252/299.61; 350/349; 350/350 R
[58] Field of Search ............ 544/179; 252/299.1, 252/299.01, 299.61, 299.63; 350/349, 350 R

[56] References Cited

U.S. PATENT DOCUMENTS

| | | | |
|---|---|---|---|
| 3,166,399 | 1/1965 | Lutz et al. | 252/299.1 |
| 3,460,750 | 6/1969 | Moriyama et al. | 252/299.1 |
| 3,703,329 | 11/1972 | Castellano | 252/299.1 |
| 4,137,193 | 1/1979 | Osman et al. | 252/299.1 |
| 4,139,273 | 2/1979 | Crossland et al. | 252/299.1 |
| 4,145,114 | 3/1979 | Coates et al. | 252/299.1 |
| 4,196,974 | 4/1980 | Harene et al. | 252/299.1 |

FOREIGN PATENT DOCUMENTS

| | | | |
|---|---|---|---|
| 2257588 | 6/1973 | Fed. Rep. of Germany | 252/299.61 |
| 2846409 | 6/1979 | Fed. Rep. of Germany | 252/299.61 |
| 2841245 | 7/1979 | Fed. Rep. of Germany | 252/299.61 |
| 2841246 | 8/1979 | Fed. Rep. of Germany | 252/299.61 |
| 105701 | 5/1974 | German Democratic Rep. | 252/299.63 |
| 132591 | 10/1978 | German Democratic Rep. | 252/299.63 |
| 137242 | 8/1979 | German Democratic Rep. | 252/299.61 |
| 49-4532 | 2/1974 | Japan | 544/179 |
| 498300 | 1/1976 | U.S.S.R. | 544/179 |

OTHER PUBLICATIONS

Demus, D., et al., Mol. Cryst. Liq. Cryst., vol. 56 (Letters), pp. 115-121 (1979).
Schubert, H., Wiss. Z. Univ. Halle, vol. XIX '70M, H.5, pp. 1-18.
Nash, J. A., et al., Mol. Cryst. Liq. Cryst., vol. 25, pp. 299-321 (1974).
Tani, C., et al., Appl. Phys. Lett., vol. 33, No. 4, pp. 275-277 (Aug. 1978).
Bloom, A., et al., Mol. Cryst. Liq. Cryst., vol. 40, pp. 213-221 (1977).
Schubert, H., et al., J. Prakt. Chemie, vol. 312, pp. 494-506 (1970).
Grakawskas, V. A., et al., J. Am. Chem. Soc., vol. 80, pp. 3155-3159 (1958).

Primary Examiner—Teddy S. Gron
Attorney, Agent, or Firm—Jordan and Hamburg

[57] ABSTRACT

A nematic liquid crystal compound adapted for the modulation of the transmitted or incident light and reproduction in color of numerals, symbols and images by electro-optical devices, the said compound having the formula or -continued
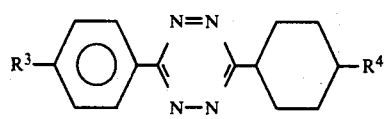
wherein
$R^1$=Br—, Cl—, $C_nH_{2n+1}$—, $C_nH_{2n+1}O$—, n being 1 to 10,
$R^2$=$C_nH_{2n+1}$—, n being 2 to 10,
$R^3$=$C_nH_{2n+1}$—, $C_nH_{2n+1}O$—, n being 1 to 10,
$R^4$=$C_nH_{2n+1}$—, $C_nH_{2n+1}O$—, n being 1 to 10.
11 Claims, 1 Drawing Figure

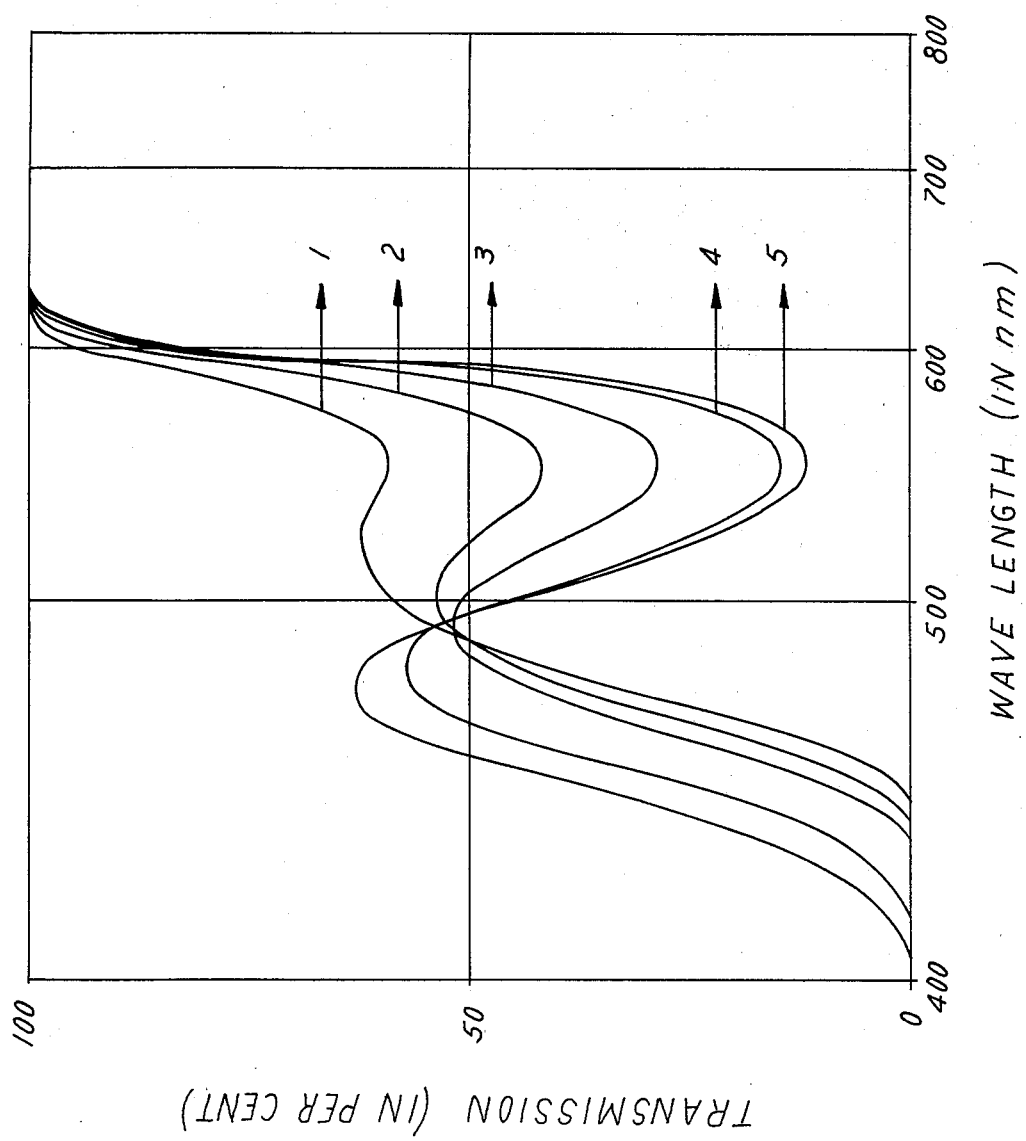

NEMATIC LIQUID CRYSTAL COMPOUNDS

This is a continuation, of application Ser. No. 009,046, filed Feb. 2, 1979, now abandoned.

BACKGROUND OF THE INVENTION

Liquid crystals are used in electro-optical structural elements. Depending on the positive or negative character and the amount of dielectric anisotropy and depending also on the initial orientation of the compound different electro-optical results may be obtained. M. Tobias, International Handbook of Liquid Crystal Displays 1975-76, Ovum Ltd., London 1976.

For practical use it is necessary that the compounds are chemically and thermally stable and that they possess sufficiently low melting points and sufficiently high clear points.

Some of the known electro-optical effects of the liquid crystals permit the reproduction in colors of figures, numerals and images. For this purpose there are used for instance liquid crystals mixed with dichroitic dyestuffs. In thin films there then occurs a change of color after turning on or turning off an electrical field (guest-host effect). However, because of insufficient solubility and light fastness of the dyestuffs these materials have not found general use.

It is accordingly prior art knowledge that the preferential orientation of nematic liquid crystals can be modified by means of an electric field. This modification of the orientation can be used for various light modulation effects, particularly for the above-referred to color reproduction of numbers or symbols and reproduction of images in color.

A prior art process is based on a procedure where a nematic liquid crystal having negative anisotropy of the dielectric constants is placed between two glass slides which are provided with a transparent electrically conductive coating to obtain a homeotropic orientation (N-layer). If this arrangement is placed between two crossed polarizers there appears the transmitted or reflected light in color after application of an electric voltage (DAP effect): M. F. Schiekel K. Fahrenschon: Applied Physics Letters 19 391 (1971).

Another prior art process is based on an orientation of a nematic liquid having positive anisotropy of the dielectric constants in a manner that the longitudinal axes of the molecule in the mean are aligned in a direction parallel to the surrounding electrodes (P-layer). If this p-layer is placed between crossed polarizers in a diagonal position and an electric voltage is applied to the electrodes the color of the transmitted or reflected light can be controlled by the voltage (DP effect) (H. Zaschke, H. Schubert, F. Kuschel, F. Dinger, D. Demus: Pat. No. 95 892 of the German Democratic Republic).

Both of these processes require the use of two polarizers which results in the loss of part of the incident light due to absorption. Particular technical difficulties arise in these processes because the thickness of the film must be kept constant within very narrow limits (about $\pm 1\mu$). The interference colors which are observed are usually highly sensitive to changes of the voltage and temperature.

These drawbacks may partly be avoided by another prior art process. In that case there are used electro-optical cells with twisted nematic or cholesteric layers or films of a weak twist in order to obtain the color-modulation of the light. In these processes a suitable dyestuff in the form of a non-liquid crystal or of a nematic, smectic or cholesteric compound is added to the liquid crystal having a particularly high positive dielectric anisotropy. These cells between crossed polarizers result in color effects in the transmitted or reflected light and after application of an electric field in color extinction (F. Kuschel, D. Demus, G. Pelzl; economic patent of the German Democratic republic No. 116,116). This process permits to reduce substantially the dependency of the color on the thickness of the film and the applied voltage. However, there remains the shortcoming resulting from the use of two polarizing filters.

A process has also become known wherein colored light modulation is effected with one liquid crystal cell by using only one polarizer. This process which is based on the guest-host effect (G. H. Heilmeier, L. A. Zanoni: Applied Physics Letters 13, 91 (1968) employs a dyestuff with positive dichroism which dyestuff is dissolved in a nematic liquid. If the liquid crystal mixture has a positive dielectric anisotropy a P-layer is produced. This P-layer in polarized light appears in color if the direction of the transition moment of the incorporated dyestuff molecules coincides with the direction of vibration of the light. After application of an electric voltage a switch is observed from a colored appearance to a faintly colored or colorless appearance.

For reasons of visibility it is preferred to use a liquid crystal mixture which has a negative dielectric anisotropy and permits to employ an N-layer. The layer in the absence of a voltage appears colorless or faintly colored. It becomes more strongly colored if it is reoriented in uniform manner by means of an electric field.

The objective of an electro-optical device by which the electrically affected areas (figures, letters, etc.) have a strong coloration and exhibit a strong contrast against the environmental area which is outside the electrical field—this objective can be accomplished with this process either not at all or only in an imperfect manner. The reason for this is that the prior art nematic liquids used for structural elements and having a negative anisotropy required too high a voltage (10 volts and more).

A further shortcoming of this prior art process for color modulation of light is the fact that the employed dyes have frequently only a low solubility in the nematic liquids. In these cases there are then obtained only faint color contrasts. Besides, there is the danger that the dyestuff crystalizes out at low operating temperatures. The light fastness of the employed dyestuff is also inadequate and therefore the color contrasts will weaken with continuing operation.

It is therefore an object of the present invention to provide for nematic liquid crystals which have high chemical or thermal stability, a strong inherent color and a marked dichroism in the visible spectral range, have sufficiently high clear points together with sufficiently low melting temperatures and possess a good light fastness.

SUMMARY OF THE INVENTION

The nematic liquid crystals which meet these objectives are characterized by the general formula

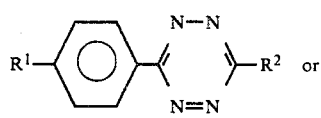

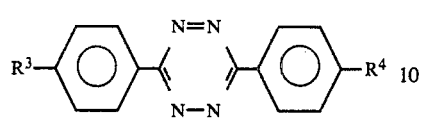

wherein.

$R^1 = Br-, Cl-, C_nH_{2n+1}-, C_nH_{2n+1}O-$, n being 1 to 10, $R^2 = C_nH_{2n+1}-$, n being 2 to 10, $R^3 = C_nH_{2n+1}-, C_nH_{2n+1}O-$ n being 1 to 10, $R^4 = C_nH_{2n+1}-, C_nH_{2n+1}O-$, n being 1 to 10.

The compounds have a high chemical and thermal stability, a high inherent color and a marked dichroism in the visible spectral area, have sufficiently high clear points at sufficiently low melting temperatures and also possess good light fastness.

The melting points of the compounds can further be substantially lowered by mixing different ones of these compounds or forming mixtures of one or more of these compounds with other liquid crystals not complying with the above formula. Thus, the operating temperatures can be substantially increased.

These mixtures permit a switch in electro-optical cells between different colors of the transmitted or reflected light.

The compounds of the invention and the above mixtures can be used in various structural elements, for instance in electronic wrist watches, pocket calculators and in various metering devices for digital data indication.

The phase change temperatures of the compounds of the invention are listed in the later following tables 1 and 2.

The letters in these tables have the following meaning:

K = crystalline solid condition
S = smectic modification
N = nematic modification
I = isotropic-liquid state.

Dots under these symbols show the presence of the particular modification; dashes indicate the absence of the modification. Data in parenthesis signify phase changes in the unstable area.

All phase change temperatures are given in degrees celsius.

Process of Making

The synthesis of the compounds of the invention can be carried out according to the following reaction scheme:

A. 3-(4-$R^1$ substituted-phenyl)-6-n-alkyl-1,2,4,5-tetrazine variant 1:

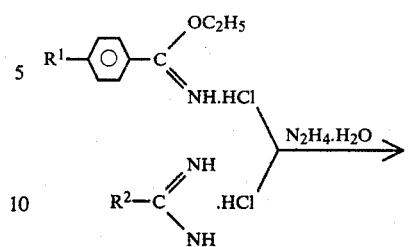

-continued

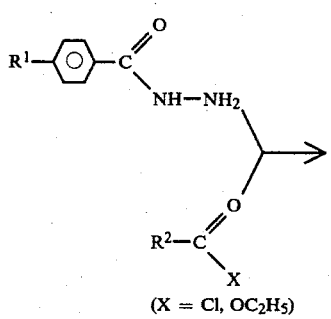

Variant 2:

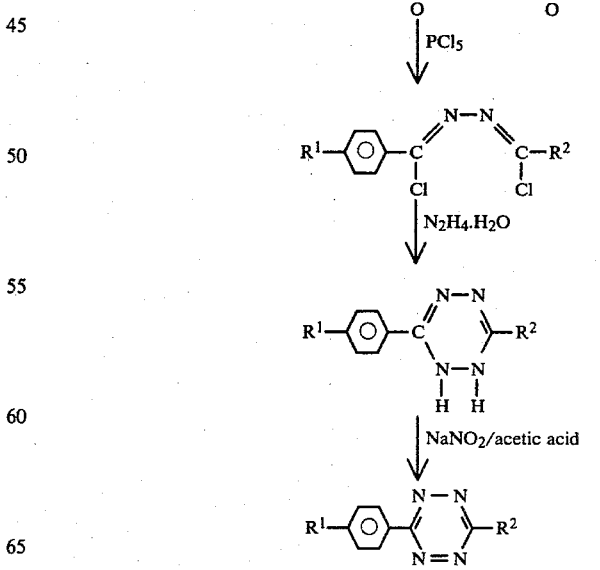

B. 3,6-Bis-(4-$R^3$ and $R^4$ substituted phenyl)-1,2,4,5-tetrazine

-continued

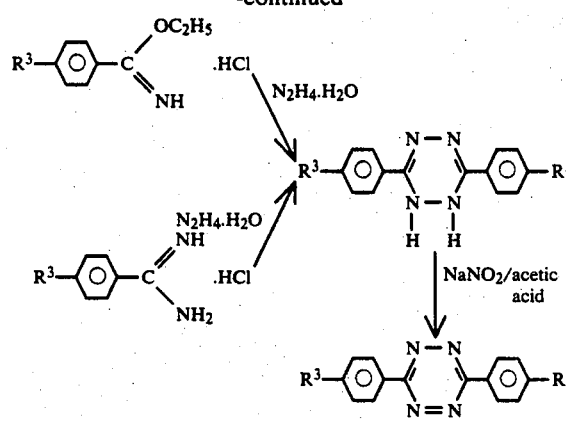

C. 3-(4-n-alkyloxy-phenyl)-6-(4-substituted phenyl)-1,2,4,5-tetrazine

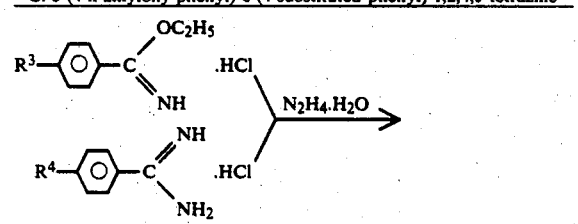

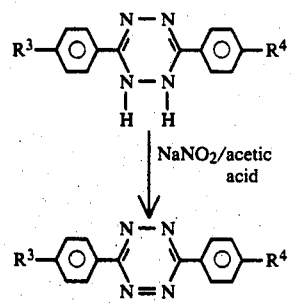

TABLE 1

Phase Change Temperatures

| No. | $R^1$ | $R^2$ | K | S | N | I |
|---|---|---|---|---|---|---|
| 1/1 | $C_6H_{13}$ | $C_7H_{15}$ | . 41 | (.27) | — | . |
| 1/2 | $C_4H_9O$ | $C_5H_{11}$ | . 55[1] | — | . 59.5 | . |
| 1/3 | $C_4H_9O$ | $C_6H_{13}$ | . 49 | — | . 57 | . |
| 1/4 | $C_4H_9O$ | $C_7H_{15}$ | . 47 | (.43) | . 62 | . |
| 1/5 | $C_5H_{11}O$ | $C_4H_9$ | . 48[3] | .49 | — | . |
| 1/6 | $C_5H_{11}O$ | $C_5H_{11}$ | . 60 | — | (. 59.5)[2] | . |
| 1/7 | $C_5H_{11}O$ | $C_6H_{13}$ | . 65 | — | (. 58.5)[2] | . |
| 1/8 | $C_5H_{11}O$ | $C_7H_{15}$ | . 49 | .52.5 | . 65 | . |
| 1/9 | $C_6H_{13}O$ | $C_5H_{11}$ | . 55 | .68 | — | . |
| 1/10 | $C_6H_{13}O$ | $C_7H_{15}$ | . 58 | .74[4] | . 76 | . |

Notes:
[1] Melting point of an unstable solid modification at 53.5° C.
[2] Monotropic nematic.
[3] Melting point of an unstable solid modification at 43° C.
[4] In the smectic area a phase change is observed at 65 to 68° C.

TABLE 2

| No. | $R^3$ | $R^4$ | K | S | N | I |
|---|---|---|---|---|---|---|
| 2/1 | $C_4H_9$ | $C_4H_9$ | . 170 | — — | . 172 | . |
| 2/2 | $C_5H_{11}$ | $C_5H_{11}$ | . 163 | — — | . 172.5 | . |
| 2/3 | $C_6H_{13}$ | $C_6H_{13}$ | . 156.5 | — — | . 157.5 | . |
| 2/4 | $C_7H_{15}$ | $C_7H_{15}$ | . 150 | — — | . 160 | . |
| 2/5 | $C_8H_{17}$ | $C_8H_{17}$ | . 145 | — — | . 151 | . |
| 2/6 | $C_9H_{19}$ | $C_9H_{19}$ | . 139 | . 145 | . 151.5 | . |
| 2/7 | $C_{10}H_{21}$ | $C_{10}H_{21}$ | . 136 | . 146 | . 146.5 | . |
| 2/8 | $CH_3O$ | $CH_3O$ | . 247 | — — | . 253 | . |
| 2/9 | $C_2H_5O$ | $C_2H_5O$ | . 238 | — — | . 268 | . |
| 2/10 | $C_3H_7O$ | $C_3H_7O$ | . 203 | — — | . 224 | . |
| 2/11 | $C_4H_9O$ | $C_4H_9O$ | . 190 | — — | . 226 | . |
| 2/12 | $C_5H_{11}O$ | $C_5H_{11}O$ | . 181 | — — | . 210 | . |
| 2/13 | $C_6H_{13}O$ | $C_6H_{13}O$ | . 163 | . 181 | . 207 | . |
| 2/14 | $C_7H_{15}O$ | $C_7H_{15}O$ | . 146 | . 183 | . 197 | . |
| 2/15 | $C_8H_{17}O$ | $C_8H_{17}O$ | . 131 | . 187.5 | . 195 | . |
| 2/16 | $C_9H_{19}O$ | $C_9H_{19}O$ | . 120 | . 188 | . 190 | . |
| 2/17 | $C_{10}H_{21}O$ | $C_{10}H_{21}O$ | . 111 | . 189.5 | — — | . |
| 2/18 | $C_4H_9O$ | $C_8H_{17}$ | . 127 | . 132.5 | . 180 | . |
| 2/19 | $C_6H_{13}O$ | $C_9H_{19}$ | . 119 | . 153.5 | . 175 | . |
| 2/20 | $C_7H_{15}O$ | H | . 107 | — — | . 128.5 | . |
| 2/21 | $C_7H_{15}O$ | OH | . 213 | — — — | . |
| 2/22 | $C_8H_{17}O$ | H | . 123 | — — | . 151 | . |
| 2/23 | $C_8H_{17}O$ | $C_8H_{17}$ | . 126 | — 161 | . 172.5 | . |

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE illustrates the interrelation of the transmission properties of a cell filled with the mixture described in Example 8 and, on the other hand, the wave length at a film thickness of 20μ.

PREFERRED EMBODIMENTS OF THE INVENTION

EXAMPLE 1

3-(4-$R^1$-substituted phenyl)-6-n-alkyl-1,2,4,5-tetrazine (variant 2)

In a three-necked flask provided with a thermometer, a stirrer, and a fractionating column, 0.03 mol of N-alkanoyl-N'-[4-$R^1$-substituted benzoyl]-hydrazine were mixed with 20 g (0.09 mol) of $PCl_5$ and the mixture was heated in a vacuum, while stirring, to 140° C. The reaction mixture became liquefied and $POCl_3$ and $PCl_5$ distilled off. The reaction was complete when no further $POCl_3$ was formed.

The contents of the flask after cooling off were taken up with ether and reacted with ice with careful cooling. The ether extract was then washed with water and a bicarbonate solution, was dried with $Na_2SO_4$ and the solvent was eliminated in a rotation vaporizer. There were obtained 1,4-dichloro-1-(4-$R^1$-substituted phenyl)-4-alkylazines in the form of yellow-brown oils which were further processed as the raw material.

The thus formed oil was then suspended in 50 to 80 ml absolute ethyl alcohol and was cooled down to −5° C. There was then added sufficient ether to form a clear solution (about 20 ml). 4 g of 80% hydrazine hydrate in 20 ml ethyl alcohol were then added dropwise upon stirring in a manner not to let the temperature to exceed 0° C. Stirring was then continued for 2 hours at room temperature. The formed dihydrotetrazine was removed by suction and was subjected to oxidation to tetrazine with $NaNO_2$/acetic acid. The purification of the product was effected by recrystallization or column chromatography. The yield was 10 to 20% of the theoretical amount.

EXAMPLE 2

3-(4-$R^1$-substituted phenyl)-6-n-alkyl-1,2,4,5-tetrazine (variante 1)

0.005 mol of 4-$R^1$-substituted benzimidoester-hydrochloride, 0.015 mol of amidinehydrochloride and 10 to 30 ml of hydrazinehydrate (80% concentration) were stirred for 2 to 5 hours at room temperature. The flask was then emptied into water and the precipitate was removed by suction and water.

The precipitate was then suspended in 30 to 40 ml of a 10% $NaNO_2$ solution, covered with 70 ml of ether and oxidized while stirring with small amounts of 10% acetic acid so as to form tetrazine.

The ether extract was then washed, dried with $Na_2SO_4$ whereupon the solvent was removed in a rotatory vaporizer. The residue was purified chromatographically with silica gel using methylene chloride as eluant. The yield was 20 to 50% of the theoretical amount.

EXAMPLE 3

3,6-bis-(4-$R^3$ and $R^4$-substituted phenyl)-1,2,4,5-tetrazine 0.02 mol of 4-substituted benzimidoester-hydrochloride were heated on a water bath for 1 hour with 10 g of hydrazinehydrate of 85% concentration. After cooling, the yellow mass of crystals of the substituted dihydro-s-tetrazine was removed by suction and washed with ether.

The precipitate was suspended in 30 to 40 ml of a 10% $NaNO_2$ solution, covered with 70 ml ether and oxidized upon stirring with small amounts of 10% acetic acid so as to form s-tetrazine. The tetrazine dissolved in the ether. The oxidation was complete as soon as the yellow starting product was used up.

The ether phase was then separated, washed with water, dried with $Na_2SO_4$ and the solvent was then distilled off in a rotary vaporizer. The residue was recrystallized from dioxane or ethyl alcohol/dioxane in a ratio of 7:1. The yield was 40 to 70% of the theoretical value.

EXAMPLE 4

3-(4-n-alkyloxy-phenyl)-6-(4-$R^3$ and $R^4$-substituted phenyl)-1,2,4,5-tetrazine 0.005 mol of 4-n-alkyloxy-benzimidoester-hydrochloride, 0.015 mol of 4-$R^3$ and $R^4$-substituted benzamidinehydrochloride and 8 ml of hydrazine hydrate of 80% concentration were stirred for 3 hours on a water bath at 80° C. and left standing over night. The precipitate was removed by suction and washed with water and ether.

The precipitate (dihydro-s-tetrazine) was suspended in 30 to 40 ml of 10% sodium nitrite solution in order to oxidize it, then covered with 70 ml ether and was reacted while stirring with small amounts of 10% of acetic acid. The oxidation was complete as soon as the yellow starting product was used up and the tetrazines were dissolved in the ether.

The ether phase was then separated, washed with water and dried with $Na_2SO_4$ whereupon the solvent was distilled off in a rotary vaporizer. The residue was subjected to chromotography through silica gel (0.05 to 0.2 ml grain size as made by the Merck Co.) with a benzene/cyclohexane mixture in a ratio of 1:1. In a column of a dimension of 100×3 cm a complete separation of the for 3 tetrazines was obtained. The yield in asymetric tetrazine was 10 to 50% of the theoretical amount.

EXAMPLE 5

An oriented film (P-film) of a thickness of about 10$\mu$ was formed of the compound above identified as 2/18 and placed between transparent electrically conductive electrodes. Upon passing a white polarized light through the film the latter appeared in a slightly yellowish color when the direction of vibration of the light coincided with the preferential direction of the P-film. After applying an electric voltage of 15 V at 163° C. a reorientation of the film took place which then appeared of an intense red violet. The switch by turning on and turning off the voltage could be repeated as often as desired.

EXAMPLE 6

Analogous to the Example 5 a P-film was formed by the compound above identified as $\frac{1}{2}$. This film without an electrical field appeared colorless when the direction of vibration of the applied polarized light coincided with the preferential direction of the P-film. The film turned red-violet by reorientation as soon as an electric voltage of 15 V was applied at 56° C. The rise time was 30 ms, the decay time was 90 ms. A color change from faint rose to red-violet and reverse could also be observed in white unpolarized light. If a green filter was interposed into the course of the rays the change was from light green to black after applying an electric field.

A composition comprising at least one of the inventive compounds may be mixed with one or more additional liquid crystal compounds of different structure. These are preferably 4-cyano-phenyl-4-n-alkylcyclohexyl carboxylates.

EXAMPLE 7

A mixture was formed of the following compounds:

| | | |
|---|---|---|
| 4-cyanophenyl-4-n-propylcyclohexyl carboxylate | 25.5 | mol-% |
| 4-cyanophenyl-4-n-butylcyclohexyl carboxylate | 24 | mol-% |
| 4-cyanophenyl-4-n-pentylcyclohexyl carboxylate | 25.5 | mol-% |
| compound Table 1 No. 4 | 25 | mol-% |

This compound mixture was nematic at room temperature and had a red color. It exhibited a negative dichroism. The mixture was then used to form a P-film of a thickness of about 20$\mu$ between transparent electrodes. The transmitted or reflected light then appeared of a faint rose color in the white linearly polarized light of which the direction of vibration coincided with the preferential direction of the P-film. After applying an electric voltage of 3 V an intense red color showed up.

The device was exposed for 600 hours to daylight. Thereafter, no extinction change was noticeable in the visible spectral range compared with the initial condition.

EXAMPLE 8

To the same mixture as described in Example 7 0.9% by weight of the yellow dyestuff "Wolfen 6" was added and dissolved therein. The dyestuff had the following formula

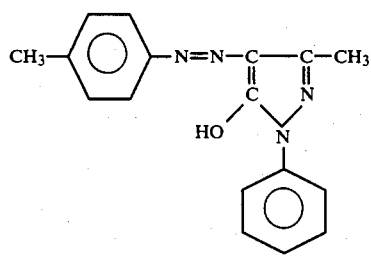

and exhibited a positive dichroism. A P-layer made with this mixture appeared yellow in transmitted or reflected light if the preferential direction of the P-layer and the direction of vibration of the applied polarized light coincided.

After applying an electric voltage of 3 V (50 Hz) a color change towards red occurred.

With reference to the drawing there is there shown the interrelation of the transmission through a cell filled with this mixture and, on the other hand, the wavelength observed at a film thickness of $20\mu$ as follows:
1—with no field applied,
2—after applying an alternating current voltage of 1.2 V,
3—after applying an alternating current voltage of 1.5 V,
4—after applying an alternating current voltage of 3.0 V,
5—after applying an alternating current voltage of 10 V.

EXAMPLE 9

To the same mixture as used in Example 8 there were additionally added for dissolution 0.4% by weight of indophenol blue. Indophenol blue is a dyestuff having a positive dichroism. A $20\mu$ thick P-film was then made with the thus-formed mixture. When the preferential direction of this film and the direction of vibration of the applied polarized light coincided the transmitted or reflected light appeared green. After applying an alternating current voltage of 3 V the film appeared in a red color.

As appears by mixture of the compounds of the invention with other liquid crystals or dyestuffs which are not liquid crystals there were obtained mixtures which permitted when used in electro-optical cells a switch between different colors of the transmitted or reflected light.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A compound of the formula

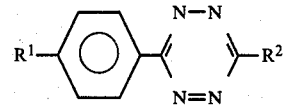

wherein $R^1$ is $C_6H_{13}$ where $R^2$ is $C_7H_{15}$ and $R^1$ is $C_nH_{2n+1}O—$, where n is 4 to 6 and $R^2$ is $C_nH_{2n+1}—$ where n is 4 to 7.

2. The compound of claim 1 wherein $R^1$ is $C_6H_{13}$ and $R^2$ is $C_7H_{15}$.

3. The compound of claim 1 wherein $R^1$ is $C_4H_9O$ and $R^2$ is $C_5H_{11}$.

4. The compound of claim 1 wherein $R^1$ is $C_4H_9O$ and $R^2$ is $C_6H_{13}$.

5. The compound of claim 1 wherein $R^1$ is $C_5H_{11}O$ and $R^2=C_4H_9$.

6. The compound of claim 1 wherein $R^1=C_5H_{11}O$ and $R^2=C_5H_{11}$.

7. The compound of claim 1 wherein $R^1=C_5H_{11}O$ and $R^2=C_6H_{13}$.

8. The compound of claim 1 wherein $R^1=C_9H_{11}O$ and $R^2=C_7H_{15}$.

9. The compound of claim 1 wherein $R^1=C_6H_{13}O$ and $R^2=C_5H_{11}$.

10. The compound of claim 1 wherein $R^1=C_6H_{13}O$ and $R^2=C_7H_{15}$.

11. The compound of claim 1 wherein $R^1=C_4H_9O$ and $R^2=C_7H_{15}$.

* * * * *